United States Patent [19]

Walk et al.

[11] Patent Number: 5,567,548
[45] Date of Patent: Oct. 22, 1996

[54] LITHIUM ION BATTERY WITH LITHIUM VANADIUM PENTOXIDE POSITIVE ELECTRODE

[75] Inventors: Charles R. Walk, Herndon; Nehemiah Margalit, Burke, both of Va.

[73] Assignee: Tracor Applied Sciences, Inc., Rockville, Md.

[21] Appl. No.: 600,206

[22] Filed: Feb. 12, 1996

Related U.S. Application Data

[63] Continuation-in-part of Ser. No. 420,294, Apr. 11, 1995, Pat. No. 5,496,663, and a continuation-in-part of Ser. No. 292,427, Aug. 19, 1994, abandoned.

[51] Int. Cl.$^6$ .............................. H01M 4/02; H01M 4/36
[52] U.S. Cl. .............................................. 429/218; 429/232
[58] Field of Search ........................... 429/192, 194, 429/218, 232

[56] References Cited

U.S. PATENT DOCUMENTS

| | | | |
|---|---|---|---|
| 5,232,795 | 7/1993 | Simon et al. | 429/192 |
| 5,316,875 | 5/1994 | Murai et al. | 429/194 |

OTHER PUBLICATIONS

Delmas et al. article in *Solid State Ionics 69, (1994)* pp. 257–264, entitled *The LixV2O5 system: An overview of the structure modifications induced by the lithium intercalation.* (Month Unavailable).

Murphy et al. article in *Inorganic Chemistry*, vol. 18, No. 10, 1979, pp. 2800–2803, entitled: *Lithium Incorporation by Vanadium (Mar) Pentoxide.*

Walk, p. 268 of chapter eleven, in *Lithium Batteries*, edited by Jean–Paul Gavano, Academic Press, Ltd., London, 1983. (Month Unavailable).

*Primary Examiner*—Stephen Kalafut
*Assistant Examiner*—Richard H. Lilley, Jr.
*Attorney, Agent, or Firm*—John S. Munday; Stephen G. Stanton

[57] ABSTRACT

A battery having a positive electrode comprising delta $Li_xV_2O_5$, wherein x ranges from 0.9 to 1.0, wherein the $Li_xV_2O_5$ has admixed therewith a conductive material. The delta $Li_xV_2O_5$ may be formed chemically by reacting $V_2O_5$ with a lithium salt to transform all of the $V_2O_5$ into $Li_xV_2O_5$. Alternatively, and preferred is to form it by electrochemically reacting an admixture of $V_2O_5$ and a lithium metal containing electrode in an electrochemical reactor cell having a lithium containing electrolyte in a non-aqueous solvent to transform all of the $V_2O_5$ into $Li_xV_2O_5$, after which the $Li_xV_2O_5$ is removed from the cell and used as a predetermined electrode configuration for use in a lithium metal free secondary cell. The positive electrode is delta $LiV_2O_5$ with a conductive material therewith. The delta form of $LiV_2O_5$ of this invention has its three strongest X-ray diffraction peaks at 4.97, 3.25 and 3.39 in order of decreasing intensity.

14 Claims, No Drawings

5,567,548

LITHIUM ION BATTERY WITH LITHIUM VANADIUM PENTOXIDE POSITIVE ELECTRODE

FIELD OF THE INVENTION

This is a continuation-in-part of a prior application entitled LITHIUM ION BATTERY WITH LITHIUM VANADIUM PENTOXIDE POSITIVE ELECTRODE, filed Apr. 11, 1995, having Ser. No. 08/420,294, now U.S. Pat. No. 5,496,663, issued Mar. 5, 1996, and a continuation-in-part of an application of the same title filed Aug. 19, 1994, having Ser. No. 08/292/427, abandoned, The present invention relates to a rechargeable or secondary battery using lithium chemistry. More particularly the present invention relates to an improved positive electrode for electrochemical cells, in which the electrochemically active material is $LiV_2O_5$ without the presence of lithium metal.

BACKGROUND OF THE INVENTION

Rechargeable or secondary batteries such as those used in computers, hearing aids, radios, cellular telephones and the like have found wide acceptance as a useful source of energy. The ability to deliver power at appropriate currents and voltages over a long period of time with regular recharging is important in making many of these devices popular and commercially successful.

As more sophisticated electronic equipment is developed that uses its own self-contained energy source, the limitations of the conventional and well known secondary batteries become more important. Size and shape and weight considerations for the power source limit the development of most portable electronic products, at least forcing compromises in performance or life or range of use.

Lithium batteries have added greatly in the development of newer electronic devices because lithium batteries have a high energy to weight and/or volume ratio. Lithium batteries have been particularly important as primary batteries, which are those that are capable of producing electrical current by an electrochemical reaction in the discharge mode one or at best two or three times. Most lithium batteries are not rechargeable, not operating in the secondary mode.

Portable devices such as computers, camcorders, telephones and the like use nickel-cadmium or nickel-metal hydride batteries as the primary power source and a small lithium battery as a backup power source for memory protection and the like, usually in the primary battery configuration.

Attempts to make secondary lithium batteries using lithium metal as the negative electrode's active material have been made, resulting in the formation of pyrophoric, finely divided metal, inefficient utilization and explosiveness due to electrical short circuits. While attempts to continue the use of the lithium metal or its alloys are continuing, the present state of the art calls for the use of special materials to contain the lithium in an ionic form; hence, the term "lithium-ion" is applied to a new emerging class of secondary cells and batteries.

Presently there are several lithium ion technologies that have been proposed, in which various negative electrode and positive electrode materials are employed. All are high voltage, nominally around 4.0 volts depending upon the specific electrochemistry used.

The negative electrode of lithium ion batteries is generally carbon in some form, such as petroleum coke or graphite, with graphite being preferred due to the ability to provide greater capacity at higher potentials than petroleum coke in particular or disordered carbons, in general. The positive electrode materials are most often transition metal oxide materials such as those using cobalt, nickel or manganese. There are three positive electrode materials presently used in lithium ion batteries, and all are similar in ability but slightly different in operating voltages. These materials are $LiNiO_2$, $LiCoO_2$ and $LiMn_2O_4$ in specific forms because they are capable of being manufactured chemically in a fully lithiated state. Because of this, cells are manufactured in the discharged state with the positive electrode material acting as the reservoir of lithium ions needed for cell reactions, avoiding the use of highly active lithium metal.

It has been understood that there must be a quantity of lithium metal incorporated into a cell using a $V_2O_5$ electrode to provide a source of lithium ions. These cells include lithium metal foil laminated with carbon as the negative electrode. The principle difficulty that has been encountered in the development of the $V_2O_5$ lithium batteries such as those that can be operated as secondary batteries is, not surprisingly, the lithium metal. Lithium use metal increases costs, decreases safety if only for the presence of residual finely divided lithium metal in discarded cells, and makes overall assembly more difficult if not more costly. One such lithium secondary battery is shown in U.S. Pat. No. 3,929,504. In that cell, the negative electrode comprises a lithium metal ribbon pressed on to an expanded copper metal grid. While the battery is effective over a large number of recharge cycles, it is not without the inherent danger of any cell containing lithium metal.

The prior art has not at this point developed an electrochemical cell configuration that uses a lithium metal free $V_2O_5$ secondary cell. At the present time, useful lithiated $V_2O_5$ is not available and this material has, essentially, not been found to exist alone in nature. $LiV_2O_5$ is not available and there is no reported method for its manufacture.

Simon U.S. Pat. No. 5,232,795 discloses a rechargeable cell having a solid electrolyte. The cell comprises a graphite negative electrode, a lithium salt in a polymer as an electrolyte, and a cathode including, inter alia, $LiV_2O_5$. There is no suggestion as to where the $LiV_2O_5$ can be obtained, in contrast with the sole example in which LiCoO2 is shown and referenced as being sold by Aldrich. Simon fails to enable one to make such a cell as no known source of suitable $LiV_2O_5$ presently exists.

Labat et al U.S. Pat. No. 5,219,677 discloses a rechargeable cell having a cathode based on $V_2O_5$. The cell includes a lithium or lithium alloy anode, an electrolyte having a lithium salt in a nonaqueous solvent, and a cathode based on vanadium oxide. Labat et al teaches that the cathodic version of $LiV_2O_5$ in their invention is formed by discharging a cell having a $V_2O_5$ cathode and lithium anode such that the cell is charged to 3.8 volts. Discharging was stopped at 2.8 volts in what Labat et al terms a prior art cell and a second cell in accordance with the Labat et al invention was discharged to 2.0 volts. An advantage is disclosed for the cell that was discharged to a greater extent.

Labat et al clearly teach that they form a preferred form of cathodic material that is designated gamma $LiV_2O_5$. Cathodes that are discharged to 2.8 volts are shown to be inferior. In any event, Labat et al does not disclose a method of producing $LiV_2O_5$ for use in cells that do not include lithium metal, either in metal or alloy form. Labat et al further does not disclose that an effective cathode material including $LiV_2O_5$ may be prepared unless it is initially discharged to about 2.0 volts as described in the reference.

Finally, Labat et al does not disclose that $LiV_2O_5$ may be used in cells that do not have lithium metal or metal alloy.

Mural et al. U.S. Pat. No. 5,316,875 teaches that electrodes for nonaqueous batteries may be made using several lithium containing positive electrodes. Specifically disclosed are $LiMn_2O_4$, $LiMnO_2$, $LiCoO_2$, $LiFeO_2$ and gamma $LiV_2O_5$. The $LiV_2O_5$ form is identified in Mural et al. more precisely as being $Li_xV_2O_5$ where x is stated to be greater than 1. It is prepared, as set forth in Embodiment One of that patent by mixing $Li_2CO_3$ and $V_2O_5$ in a 1:2 mol ratio followed by heating at 700° C.

The gamma form of $LiV_2O_5$ is shown to be effective in certain cells, but is made more effective by dipping the positive electrode in a lithium-adding material such as butyllithium, phenyllithium or naphthyllithium. This secondary step after formation of the basic gamma $LiV_2O_5$ material is accomplished by dipping the material in a hexane solution of butyllithium to form $Li_{1.15}V_2O_5$. No X-ray diffraction pattern is shown for this material even though there is such a pattern for the manganese version of the Mural et al. positive electrodes.

It would be of advantage to the art if $LiV_2O_5$ were available as a positive electrode material for use in electrochemical cells without the presence of lithium metal in any form.

Accordingly, it is an object of the present invention to provide an electrochemical cell that employs $V_2O_5$ in a lithiated form without the presence of lithium metal in the cell.

Another object of this invention is to provide a positive electrode which is formed from $LiV_2O_5$.

Other objects will appear hereinafter.

SUMMARY OF THE INVENTION

It has now been discovered that the above and other objects of the present invention may be accomplished in the following manner. Specifically, the present invention provides a new positive electrode material for lithium ion batteries in which the positive electrode material is formed from $LiV_2O_5$. The $LiV_2O_5$ positive electrode material is then used in an improved cell that has no lithium metal to thereby dramatically improve safety issues associated with lithium electrochemical cells.

The present invention solves the safety issues that have kept this high energy, high single cell voltage, stable, rechargeable $C/LiV_2O_5$ electrochemical system from being utilized in those many applications that could benefit from this new system. Both the $LiV_2O_5$ electrode and the cell using the $LiV_2O_5$ electrode have many commercial applications, thereby expanding the role of lithium batteries in the market place.

The preferred form of the positive electrode of this invention is $Li_xV_2O_5$, wherein x ranges from 0.9 to 1.0, and is also named delta $LiV_2O_5$. $LiV_2O_5$, as defined herein, has its three strongest X-ray diffraction peaks at 4.97, 3.25 and 3.39 in order of decreasing intensity.

The positive electrode $LiV_2O_5$ of this invention is preferably formed by reacting electrochemically an admixture of $V_2O_5$ and a lithium metal containing electrode in an electrochemical reactor cell having lithium containing electrolyte in a non-aqueous solvent to reduce said admixture to transform all of said $V_2O_5$ into $Li_xV_2O_5$; said $Li_xV_2O_5$ being removed from said cell and formed into a predetermined electrode configuration for use in a lithium metal free secondary cell. It may also be made chemically.

DETAILED DESCRIPTION OF THE PREFERRED EMBODIMENT

The present invention relates to an improved lithium ion cell in which the positive electrode of this invention is used to provide a safe and effective battery without the use of lithium metal. The positive electrode has a lithiated form of $V_2O_5$ which is designated as $LiV_2O_5$. While it may be formed by chemical reaction, the preferred method of making the $LiV_2O_5$ of this invention is to lithiate $V_2O_5$ by reducing it electrochemically by the reaction of no more than about one electron per molecule of $V_2O_5$ to form $LiV_2O_5$ without any lithium metal in the positive electrode material, whether formed chemically or electrochemically or otherwise.

As has been noted above, the $LiV_2O_5$ of this invention is not commercially available and it is not described in the literature. It is preferably formed by the method of this invention, in an electrochemical reactor by discharging $V_2O_5$ in the presence of lithium or lithium alloy with a non-aqueous solvent by limiting the reduction of $V_2O_5$ to no more than one Faraday per mole of $V_2O_5$. Graphite or another suitable conductive material is needed since $V_2O_5$ is not conductive enough by itself. The $LiV_2O_5$ material thus formed is then removed from the reactor by one of several alternative methods. At this time a ready to use $LiV_2O_5$ positive electrode material is present that may easily be used in nonaqueous cells without any lithium metal or metal alloy in any form.

The positive electrode of the present invention comprises a specific form of $LiV_2O_5$, namely $Li_xV_2O_5$, wherein x ranges from 0.9 to 1.0. As noted above the $Li_xV_2O_5$ may be formed by electrochemically reacting an admixture of $V_2O_5$ and a lithium metal containing electrode in an electrochemical reactor cell having a lithium containing electrolyte in a non-aqueous solvent to transform all of the $V_2O_5$ into $Li_xV_2O_5$, after which the $Li_xV_2O_5$ is removed from the cell and formed into a predetermined electrode configuration for use in a lithium metal free secondary cell. It may also be possible to make this specific form of $Li_xV_2O_5$ by chemical means directly.

Successful use of the positive electrode material of this invention in a cell containing no lithium metal has herein been found to be possible such that the cell operates as a rechargeable cell over many cycles and, importantly, without lithium metal in any form as a potential hazard.

An alternative name for the positive electrode is delta $LiV_2O_5$. The form of $LiV_2O_5$ of this invention has its three strongest X-ray diffraction peaks at 4.97, 3.25 and 3.39 in order of decreasing intensity. Yet another way to describe the $LiV_2O_5$ of this invention is to define it as the product of the above described cell after the cell has been discharged to about 2.8 volts. Discharge to a greater or lesser depth will result in formation of other forms of $Li_xV_2O_5$ such as gamma $V_2O_5$, where between 1 and 2 lithium ions are associated with the material. Presented below in Table I are the diffraction peaks for these materials and the approximate value for x, that being the amount of lithium ion therein.

TABLE I

| SAMPLE | RANGE, X | 1ST PEAK | 2ND PEAK | 3RD PEAK |
| --- | --- | --- | --- | --- |
| alpha $V_2O_5$ | $0 < X < 0.1$ | 4.38 | 3.40 | 2.88 |
| epsilon | $0.35 < X < 0.7$ | 4.68 | 2.83 | 3.42 |
| $Li_xV_2O_5$ | $0.9 < X < 1$ | 4.97 | 3.25 | 3.39 |

TABLE I-continued

| SAMPLE | RANGE, X | 1ST PEAK | 2ND PEAK | 3RD PEAK |
|---|---|---|---|---|
| delta $Li_xV_2O_5$ | | | | |
| gamma $Li_xV_2O_5$ | $1 < X < 2$ | 5.33 | 3.32 | 2.86 |

As can be seen from Table I, each form of $Li_xV_2O_5$ has a different set of primary peas. For a more complete listing of the eight strongest diffraction peak lines for these various forms of $Li_xV_2O_5$, Table II is presented.

TABLE II

| Diffraction peak, decreasing intensity | ALPHA $V_2O_5$ | EPSILON $Li_xV_2O_5$ | DELTA $Li_xV_2O_5$ | GAMMA $Li_xV_2O_5$ |
|---|---|---|---|---|
| 1st | 4.38 | 4.68 | 4.97 | 5.33 |
| 2nd | 3.40 | 2.83 | 3.25 | 3.32 |
| 3rd | 2.88 | 3.42 | 3.39 | 2.86 |
| 4th | 5.76 | 2.60 | 4.54 | 3.22 |
| 5th | 2.61 | 2.95 | 2.99 | 4.67 |
| 6th | 4.09 | 2.29 | 2.82 | 4,84 |
| 7th | 2.76 | 1.89 | 1.75 | 3.09 |
| 8th | 1.76 | 1.79 | 1.88 | 2.08 |

Again it can readily be seen that the diffraction pattern for the delta form of $Li_xV_2O_5$, where x is between 0.9 and 1, is different in kind from the unlithiated vanadium pentoxide and the two other forms of $Li_xV_2O_5$.

The essence of the invention is that the $Li_xV_2O_5$ positive electrode material thus formed has been formed by reducing $V_2O_5$ with Lithium by one Faraday per mole of $V_2O_5$ during discharge in the reactor. While it may be possible to also make this form of $Li_xV_2O_5$ chemically, it is essential that the value for x range from 0.9 to 1. This has been accomplished by reducing $V_2O_5$ as described above.

In contrast, Mural et al. U.S. Pat. No. 5,316,875 teaches that electrodes for nonaqueous batteries may be made using gamma $LiV_2O_5$, which is also shown in Table I and Table II. the gamma form, according to Mural et al. is formed by reacting The $LiV_2O_5$ form is identified in Mural et al. more precisely as being $Li_xV_2O_5$ where x is stated to be greater than 1, which conforms to the data presented in Table II and the diffraction peaks for that material. Gamma $Li_xV_2O_5$, where x ranges from 1 to 2 is prepared, as set forth in Embodiment One of that patent by mixing $Li_2CO_3$ and $V_2O_5$ in a 1:2 mol ratio followed by heating at 700° C. It is not described as being prepared electrochemically and there is no recognition that other forms of $Li_xV_2O_5$ exist. The gamma form of $Li_xV_2O_5$ is specifically disclosed as one of a number of positive electrodes that are improved by the addition of lithium via the use of butyllithium and the like. Efforts in the laboratory were made to duplicate the preparation of gamma $Li_xV_2O_5$ as described by Mural et al. were unsuccessful, as no gamma $LiV_2O_5$ was formed. It is recognized that the disclosure of Mural et al. is limited in details, so there is no reason to believe that Mural et al. did not produce gamma $Li_xV_2O_5$, where x is between 1 and 2. More importantly the tests also verified that following the teachings of Muri et al did not produce any delta $Li_xV_2O_5$, with x between 0.9 and 1, as is the case in the present invention.

While applicants do not wish to be bound by theory that has not been fully documented, it is believed that Muri et al. and other chemical methods of making positive electrode materials are different in kind from what applicants have discovered. Specifically, the electrochemical production of $LiV_2O_5$ in accordance with the present invention produces a material that has been positively identified by independent laboratory analysis by X-ray diffraction to be delta $LiV_2O_5$, where the amount of lithium ranges from 0.9 to 1 ions per molecule. Presented below in Table III is a comparison of the theoretical values and experimental values for diffraction peaks for $LiV_2O_5$ produced in accordance with the present invention. As can be clearly seen, the produced positive electrode is essentially delta $LiV_2O_5$.

| Diffraction Peak | Delta form $Li_xV_2O_5$ (theoretical values) | Delta form $Li_xV_2O_5$ (actual values) |
|---|---|---|
| 1st | 4.97 | 4.94 |
| 2nd | 3.25 | 3.25 |
| 3rd | 3.39 | 3.35 |
| 4th | 4.54 | 4.54 |
| 5th | 2.99 | 2.99 |
| 6th | 2.82 | 2.81 |
| 7th | 1.75 | 1.75 |
| 8th | 1.88 | 1.88 |

As can be seen there is admirable correlation between theoretical and actual values for delta $LiV_2O_5$.

The electrolytes of the present invention may be any of the known lithium ion containing salts dissolved in conventional solvents that have been found useful in lithium batteries but their composition may vary between the reactor and the production cell. The solvents generally are aprotic, stable toward lithium, have low viscosity, high dielectric constant, high solvating power for suitable electrolyte salts, economical in cost and availability and have minimum impurities. Preferred are propylene carbonate, dimethylcarbonate, gamma butyrolactone, tetrahydrofuran, 1,2 dimethoxythene, ethylene carbonate, diethyl-carbonate, diethyl ether and dioxalane. The function of the electrolyte in the first portion of the present invention, forming the $LiV_2O_5$ positive electrode material in an electrochemical reactor is to carry the lithium ions a negative electrode, for example, lithium metal or metal alloy, into the $V_2O_5$ during the discharge step. The second function of such an electrolyte is to act as a conventional nonaqueous solution in a secondary lithium ion cell during operation of such a cell in which the positive electrode was formed from the $LiV_2O_5$ positive material of this invention without any lithium metal present in the cell, particularly in the anode portion thereon.

The electrolyte salts most preferred are those that are stable, have high conductivity, have an acceptable molecular weight, have no reactivity or side reactions and are safe, available and non-toxic. Preferred are lithium hexafluorophosphate, lithium hexafiuoroarsenate, lithium bis(trifluoromethyl sulfonyl imide), lithium trifluoromethanesulfonate or lithium triflate, lithium tris(triflouromethyl sulfonyl) methide, lithium tetrafluoroborate, lithium perchlorate, lithium tetrachloroaluminate and lithium perfluorobutane. Again the salts useful in this invention need to be chosen to function in two separate operations, first during formation of the $LiV_2O_5$ in the reactor and second during operation of the final cell product.

Most preferred are solvent mixtures, such as an equal mixture of propylene carbonate and dimethlyene carbonate and an equal mixture of dimethyl carbonate and diethyl carbonate. Most preferred electrolyte salts are lithium hexafluorophosphate and lithium bis(trifiuoromethyl sulfonyl imide) for use, respectively, in the two solvent mixtures identified above.

It is contemplated that the reactor used to form the LiV$_2$O$_5$ cathode or positive electrode material by discharging V$_2$O$_5$ with a lithium metal containing anode may use the same or different salt/solvent combinations than the final cell using the cathode and not containing any lithium metal. For example, more effective but more costly salt/solvents may be used to produce the LiV$_2$O$_5$ positive electrode material in a factory where recycling and reclaiming the salt/solvent is feasible, while a less expensive or less environmentally unfriendly solvent/salt combination may be used in products sold and used elsewhere. The particular salt and solvent choices depend on design parameters that are not part of this invention.

The concentration of lithium ion in the non-aqueous solvent will in part depend upon the solvent and salt, but should be sufficient to permit discharge of the V$_2$O$_5$ and the conductive material which together form the physical material being made into the positive electrode material. Typical concentrations range from less than 0.5 molar to as much as 2.0 molar, with 0.85 to 1.5 molar being found using different electrolyte salts and solvents. Concentrations of between 1.0 and 1.5 molar are standard in the art and thus preferred, with about 1.2 molar being most preferred. The electrolyte salt and solvent mixture should have sufficient lithium ion conductivity, preferably between $3\times10^{-3}$ and $2\times10^{-2}$ ohm$^{-1}$–cm$^{-1}$ over a range of operating temperatures. In a manufacturing facility where the positive electrode is being prepared, temperature is controlled. When the positive electrode of this invention is placed in a cell for use, temperature considerations are more important and should be considered. For final products, for example, the operational liquid range should be from less than $-40°$ C. to more than $70°$ C., and should be thermally stable to at least $70°$ C. for the cell. As noted above, a much more limited temperature range will suffice for the reactor that produces the positive electrode in production.

The amount of conductive material will depend upon the material chosen. Graphite is preferred as a conductive material because it is a known battery material that can be used in its known manner with already existing manufacturing facilities. The amount by weight of graphite or other conductive material may be as little as 2 percent by weight and as much as 20 percent, with 10 percent by weight, based on the V$_2$O$_5$ being preferred. Other forms of carbon are also used.

The lithium metal free negative electrodes used with the positive electrode of this invention are those materials that react according to the following formal reaction of $xC+Li\Longleftrightarrow LiC_x$. Examples include graphites and synthetic graphites, fibers, cokes, mesocarbons, doped or substituted carbons (with boron, nitrogen or phosphorous, for example) and the Fullerenes. These last materials comprise a series of carbon atoms attached together in ball like formations. A typical formulation would be C$_{60}$. Some Fullerenes incorporate five times the amount of lithium ions as common graphites. Once the reactor electrochemical cell has been loaded, it is necessary to discharge V$_2$O$_5$ in to produce the LiV$_2$O$_5$ of this invention.

Discharge of the V$_2$O$_5$ in the reactor is intended to proceed only until about one Faraday per mole of V$_2$O$_5$ has been discharged. Discharge in this manner produces a smooth voltage curve that can be readily monitored during production of the positive electrode, dropping slowly from the initial voltage over a period of time. As one Faraday of discharge is approached, the slope of the discharge curve changes, dropping faster between about 3.0 volts and 2.4 volts. The ideal cut-off for the discharge is about 2.8 volts.

Contrary to the teachings of previously discussed Labat et al U.S. Pat. No. 5,219,677, the cell of this invention is not operated by charging to 3.8 volts and discharging to 2.0 volts.

If further discharge of the V$_2$O$_5$, as per Labat, takes place, the thus formed material has only limited utility as a cathode or positive electrode material in accordance with the present invention. Rather, contrary to what Labat et al clearly teaches, a totally satisfactory cathode is formed after being discharged to 2.8 volts. It has been found that if one discharges much more than one Faraday, other materials such as Li$_2$V$_2$O$_5$ are formed and the excessively discharged material is no longer as effective. As the preferred cut-off voltage for producing LiV$_2$O$_5$ material should be 2.8 volts, the formation process in the reactor should consist of, for example, a constant voltage discharge with a suitable maximum, limiting current, or a pulse regime where discharge voltage does not exceed 2.8 volts.

The positive electrode material of the present invention can be conveniently fabricated into a lithium ion battery. C/LiV$_2$O$_5$ cells using various electrolytes and non-aqueous solvents as identified above are capable of producing a steady supply of electrical energy at high voltage even after many discharge and recharge cycles. It should be noted that the parameters for cycling of the product cell, especially discharge, could vary from those used in the reactor, depending upon cell design and user application.

Various methods are available for processing the discharged LiV$_2$O$_5$ into an appropriate form for use as a cathode material. The most straightforward method is to merely remove the discharged LiV$_2$O$_5$ electrode from the reactor and scrape the material from the supporting grid to form it into a powder form. Another method involves forming the V$_2$O$_5$ that is to be discharged in the reactor with a soluble binder. After forming the LiV$_2$O$_5$, the binder is dissolved and again the cathodic material is in the form of a powder for further manufacture and use as a positive electrode.

Alternatively, it may be desirable to use the electrode as it is formed by simply removing it from the reactor and placing it in a cell with the carbon anode described above. Another embodiment of the present invention is to press V$_2$O$_5$ against a carbonaceous conductive grid or plate under sufficient pressure to allow the cathode material to conduct adequate current via the carbonaceous material. Yet another embodiment is to bind the V$_2$O$_5$ with a binder and grind or powder the LiV$_2$O$_5$ after its formation. In this embodiment, the binder need not be soluble since it is ground or powdered along with the LiV$_2$O$_5$.

Tests have confirmed that the present invention produces a satisfactory lithium metal free cell using LiV$_2$O$_5$. More than 500 cycles with a 100% depth of discharge cycle are obtained with cells according to the present invention. This is clearly an improved cell that is safe and effective.

While particular embodiments of the present invention have been illustrated and described, it is not intended to limit the invention, except as defined by the following claims.

We claim:

1. A lithium ion battery comprising:
   a lithium free negative electrode, a non-aqueous solvent and a positive electrode including delta LiV$_2$O$_5$ admixed with a conductive material, said negative electrode being substantially free of lithium ions when substantially one mole of lithium ions per mole of V$_2$O$_5$ is in said positive electrode.

2. The battery of claim 1, wherein said delta LiV$_2$O$_5$ has its three strongest X-ray diffraction peaks at 4.97, 3.25 and 3.39 in order of decreasing intensity.

3. The battery of claim 2, wherein said delta $LiV_2O_5$ positive electrode is formed electrochemically in a cell discharged to about 2.8 volts.

4. A lithium ion battery comprising:

a lithium free negative electrode, a non-aqueous solvent and a positive electrode including delta $Li_xV_2O_5$, wherein x ranges from 0.9 to 1.0, said $Li_xV_2O_5$ having admixed therewith a conductive material.

5. The battery of claim 4, wherein said delta $LiV_2O_5$ has its three strongest X-ray diffraction peaks at 4.97, 3.25 and 3.39 in order of decreasing intensity.

6. The battery of claim 4, wherein said $Li_xV_2O_5$ is formed by electrochemically reacting an admixture of $V_2O_5$ and a lithium metal containing electrode in an electrochemical reactor cell having lithium containing electrolyte in a non-aqueous solvent to reduce said admixture to transform all of said $V_2O_5$ into $Li_xV_2O_5$; said $Li_xV_2O_5$ being removed from said cell and formed into a predetermined electrode configuration for use in a lithium metal free secondary cell.

7. A method of making a positive electrode useful for a lithium ion battery, comprising the steps of:

reacting $V_2O_5$ and a lithium containing salt to reduce said $V_2O_5$ by one about Faraday to convert substantially all of said $V_2O_5$ to form delta $LiV_2O_5$;

removing said delta $LiV_2O_5$ for use as said positive electrode.

8. The method of claim 7, wherein said delta $LiV_2O_5$ is formed by electrochemically reacting an admixture of $V_2O_5$ and a lithium metal containing electrode in an electrochemical reactor cell having lithium containing electrolyte in a non-aqueous solvent to reduce said admixture to transform all of said $V_2O_5$ into delta $LiV_2O_5$.

9. The method of claim 8, wherein said delta $LiV_2O_5$ is removed from said cell and formed into a predetermined electrode configuration for use in a lithium metal free secondary cell.

10. The method of claim 7, wherein said delta $LiV_2O_5$ has its three strongest X-ray diffraction peaks at 4.97, 3.25 and 3.39 in order of decreasing intensity.

11. The method of claim 8, wherein said delta $LiV_2O_5$ is removed from said cell and thereafter mixed with a conductive material therewith to form said positive electrode.

12. The method of claim 8, wherein said $V_2O_5$ is mixed with a conductive material prior to converting said $V_2O_5$ to form delta $LiV_2O_5$.

13. The method of claim 12, wherein said $V_2O_5$ is mixed with a conductive material prior to converting said $V_2O_5$ to form delta $LiV_2O_5$ to thereby form said positive electrode in situ.

14. The method of claim 13, said positive electrode is removed and placed in a lithium metal free cell.

* * * * *